Nov. 16, 1954  R. O. STEKOLL  2,694,548
VALVE ASSEMBLY
Filed Dec. 22, 1949  2 Sheets-Sheet 1
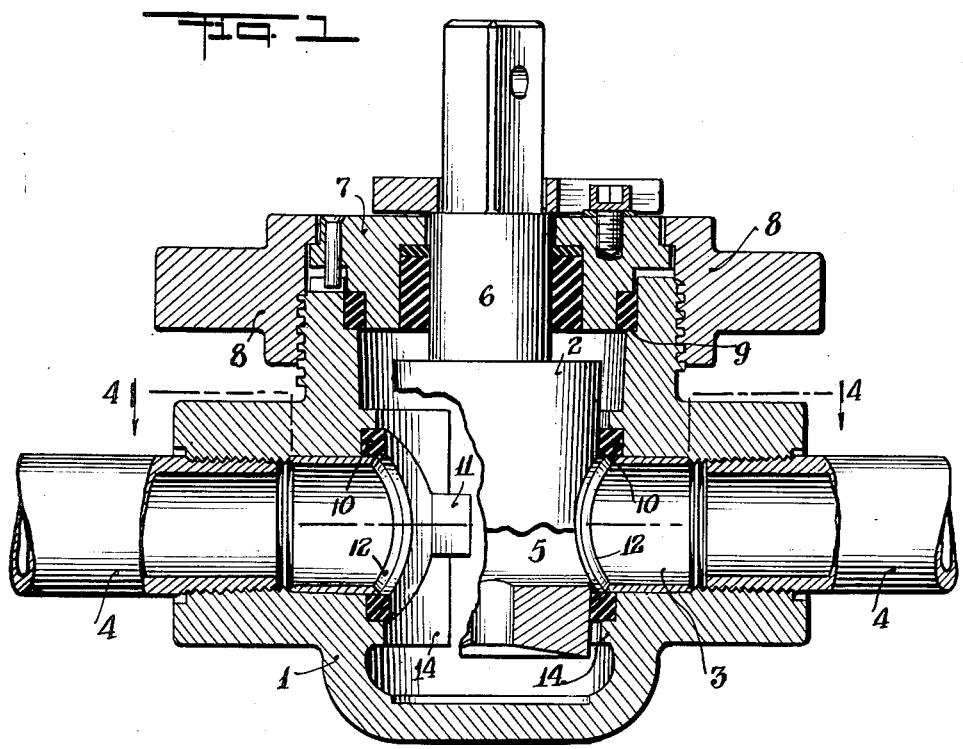
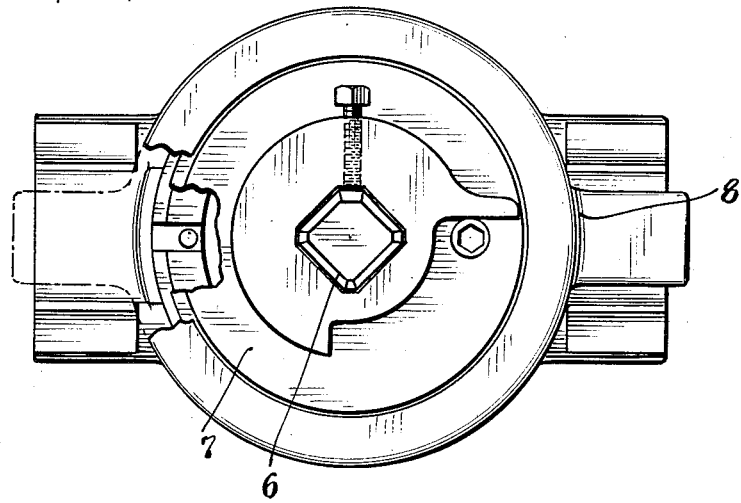
INVENTOR.
Robert O. Stekoll
BY  E. H. Hardway
ATTORNEY

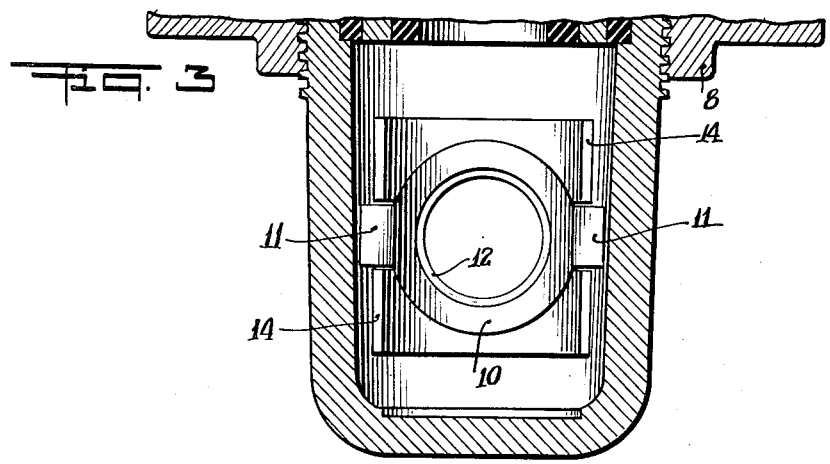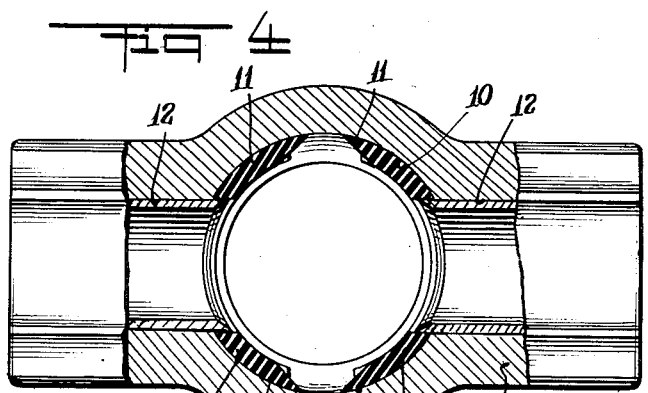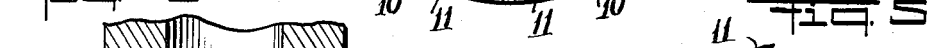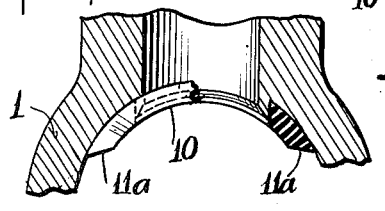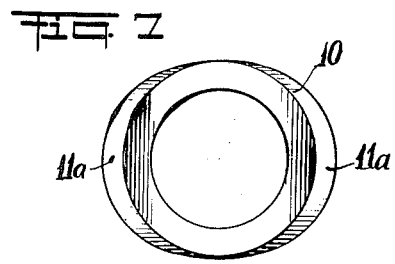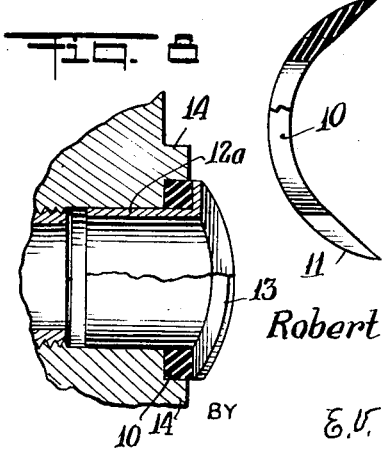

United States Patent Office 2,694,548
Patented Nov. 16, 1954

2,694,548

VALVE ASSEMBLY

Robert O. Stekoll, Houston, Tex.

Application December 22, 1949, Serial No. 134,369

2 Claims. (Cl. 251—317)

This invention relates to a valve assembly.

An object of the invention is to provide an assembly of the character described having a valve casing provided with a passageway for fluid therethrough and a valve rotatable in the casing and having a passageway therethrough which may be turned into and out of registration with the passageway through the casing to open and close the valve with a novel type of packing between the valve and casing for forming a valve seat and adapted to completely seal the valve with the seat.

It is another object of the present invention to provide a novel type of seal ring of such construction that it will yield to the valve and not be injured by it during the rotation of the valve toward open or closed position.

The assembly also includes hardened liners within the passageway on opposite sides of the valve to reduce wear and cutting of the casing around the passageway.

In one form of the invention, the seat liners, which work in the casing, are loosely mounted, said liners having concavo-convex flanges which fit the contours of the liners.

Other objects and advantages will be apparent from the following specification, which is illustrated by the accompanying drawings, wherein:

Figure 1 is an elevational view, partly in section, of the complete assembly;

Figure 2 is a plan view, partly broken away;

Figure 3 is a fragmentary, transverse, sectional view;

Figure 4 is a top plan view, partly in section;

Figure 5 is a plan view of the seal ring employed, partly in section;

Figure 6 is a fragmentary, cross-sectional view showing another type of seal ring;

Figure 7 is an elevational view of the seal ring shown in Figure 6; and

Figure 8 is a fragmentary, cross-sectional view taken through one form of the wear ring.

Referring now more particularly to the drawings, wherein like numerals of reference designate the same parts in each of the figures, the numeral 1 designates the valve casing which is of a general cupped shape and in this casing there is a rotatable valve 2.

The casing has a passageway 3 therethrough connecting the pipe sections 4, 4 and the valve has a transverse flowway 5 therethrough which may be turned into and out of alignment with the passageway.

On one end of the valve there is a cylindrical stem 6 and around said stem and forming a seal therewith there is a stuffing box 7 which is clamped in position by the clamp nut 8 which may be screwed on to the casing and which is provided with a seal 9 between it and the casing.

Around the passageway 3 on each side of the valve there is a resilient ring 10. This ring is circular in shape as shown in Figure 3 and has the laterally extending guards 11, 11. These guards 11 are tapered on each side to a relatively thin edge and as the valve is turned they yield to the adjacent edge of the valve around the flowway and as the pressure of said edge on the guard increases as the valve is turned until the edge reaches the portion of the ring 10, which is of full thickness, the material of the seal ring will be more readily compressed by the valve and said material will not be so liable to become distorted and mutilated.

In the form shown in Figures 6 and 7 portions of the guards 11 have been removed to shorten the same and the guards have been beveled in a direction circumferentially of the valve and away from the passageway and widened as at 11a so that the valve will readily pass by them without mutilation as has been stated.

As is shown in Figures 1 and 4, the passageways 3 are provided with hard metal liners 12, 12 which extend inwardly into the seal rings as shown in Figures 1 and 4. These liners may be driven into place or welded into position.

As shown in Figure 8, the liner 12a is fitted into place in the passageway through the seal rings 10 and its end has a marginal rest 13 which rests against the seal ring 10. When the valve is in place it will force the liners 12a into an outward position thus compressing corresponding seal rings and forming very tight seals.

It will be noted from an inspection of Figures 1 and 3 that on opposite sides of the guards 11, the inside wall of the valve casing is provided with projections 14, 14 which are arcuate, of uniform thickness, which are integral with the valve casing and which closely fit around the rings 10 on opposite sides of the guards 11. These together with sealing rings form valve seats and they assist in retaining said rings against displacement.

The drawings and description discloses what are now considered to be preferred forms of the invention by way of illustration only and not by limitation while the broad principle of the invention will be defined by the appended claims.

What I claim is:

1. A valve assembly comprising, a valve casing having a passageway therethrough, a valve in the casing having a flowway therethrough and being turnable to bring the flowway into and out of registration with the passageway, annular resilient seals countersunk into the casing around the passageway and forming valve seats, said annular seals, having oppositely disposed portions extending circumferentially of the valve beyond the outer peripheries of the seals formed with outwardly flaring surfaces facing said valve, the outer extremities of said portions being spaced outwardly from the valve, and hard metal liners fixed in the passageway in sealing engagement with said seals.

2. A valve assembly comprising, a valve casing having a passageway therethrough, a valve in the casing having a flowway therethrough and being turnable to bring the flowway into and out of registration with the passageway, resilient seal rings countersunk into the casing around the passageway and having annular faces and forming valve seats, said rings having portions extending circumferentially of the valve beyond said annular faces at opposite sides of the passageway and formed with outwardly flaring surfaces facing the valve and merging with said annular faces, the outer extremities of said surfaces being spaced away from said valve.

References Cited in the file of this patent

UNITED STATES PATENTS

| Number | Name | Date |
|---|---|---|
| 293,329 | Jenkins | Feb. 12, 1884 |
| 461,084 | Pratt | Oct. 13, 1891 |
| 477,605 | Pratt | June 21, 1892 |
| 477,607 | Pratt | June 21, 1892 |
| 1,026,457 | Reynolds | May 14, 1912 |
| 1,049,450 | Caskey | Jan. 7, 1913 |
| 1,157,956 | Osborne | Oct. 26, 1915 |
| 2,433,732 | Brown | Dec. 30, 1947 |